United States Patent

[11] 3,537,521

| [72] | Inventor | Bobby G. Harnsberger<br>Houston, Texas |
|---|---|---|
| [21] | Appl. No. | 786,430 |
| [22] | Filed | Dec. 23, 1968 |
| [45] | Patented | Nov. 3, 1970 |
| [73] | Assignee | Texaco Inc.<br>New York, New York<br>a corporation of Delaware |

[54] SAND CONSOLIDATION METHOD
12 Claims, No Drawings

[52] U.S. Cl......................................................... 166/295
[51] Int. Cl....................................................... E21b 33/13
[50] Field of Search........................................... 166/295,
300, 276; 260/33.4, 29.1, 33.6

[56] References Cited
UNITED STATES PATENTS

| 3,210,310 | 10/1965 | Holbert et al................. | 166/295X |
| 3,227,688 | 1/1966 | Kern et al...................... | 166/295X |
| 3,247,900 | 4/1966 | Perry et al..................... | 166/295X |
| 3,285,339 | 11/1966 | Walther et al................. | 166/295 |
| 3,294,165 | 12/1966 | Meijs et al..................... | 166/295 |
| 3,297,087 | 1/1967 | Spain............................. | 166/295 |
| 3,310,111 | 3/1967 | Pavlich et al.................. | 166/295 |

*Primary Examiner*—Stephen J. Novosad
*Attorneys*—K. E. Kavanagh and Thomas H. Whaley ABSTRACT: Method of and composition for the treatment of unconsolidated sandy formations to stabilize the formation comprising injecting a treating composition of 25–100 percent by volume of acrolein dimer and 75–0 percent by volume of an oxygenated hydrocarbon solvent into said formation, effecting polymerization of said dimer and formation of a fluid permeable consolidated sand in said formation.

SAND CONSOLIDATION METHOD

The present invention relates to the treatment of permeable underground formations. More particularly, the present invention relates to a method of treating permeable underground oil and/or gas containing formations to stabilize the sandy portion thereof and to a treating composition useful in the stabilization of incompetent sand containing underground formations.

The recovery of fluids such as gas and/or oil from underground formations has been troublesome in areas wherein the underground formation is composed of one or more incompetent sand containing layers or zones. The sand particles in the incompetent zone and/or layer tend to move or migrate to the well bore during recovery of the formation fluids from the particular zone and/or layer and frequently the moving sand particles block the passageways leading to the well bore. Plugging or materially impairing the flow of the formation fluids toward the bore hole results in a loss of these fluids to the producer or so decreases the rate of oil recovery from the well as to cause the well to be shut down because it is economically unattractive to continue to produce therefrom. An additional adverse factor resulting from the movement of the sand particles toward the well bore is that they are often carried along with the formation fluids to the well bore and passed through the pipes, pumps, etc. being used to recover the formation fluids to the surface with resulting damage to the moving parts thereof as the said particles are very abrasive.

Many attempts have been made heretofore to prevent or decrease the flow of undesirable sand particles from the formation and into the production tubing and associated equipment, such as by the placement of sand screens, filters, liners and so forth. These prior attempts have been unsuccessful for a number of reasons among which is that these mechanical devices fail to prevent completely the flow of the formation particles into the production equipment. In addition these devices interfere with various types of the completion and workover operations. In recent years, the industry has attempted to avoid the difficulties encountered in the use of mechanical devices by employing various chemical compositions to effect consolidation of the underground incompetent formations. These methods have generally consisted of injecting into the underground formation polymerizable resinous materials which when subsequently polymerized form permeable barriers in the formation to prevent the sand particles from movement therethrough. However, this technique of sand consolidation has not met with widespread acceptance because of the inherent difficulties of effecting polymerization of the resinous materials in the formation to a degree sufficient to consolidate these underground formations and yet permitting the unobstructed flow of the desirable formation fluids therethrough. Further, the cost associated with these resin coating methods has been relatively high in comparison with the prior mechanical methods, and the time required for resin polymerization is often long at low temperatures.

By the method of the present invention one is able to treat effectively the underground formation to be stabilized in a rapid and efficient manner while minimizing the disadvantages of these prior art methods both mechanical and chemical.

One object of the present invention is to provide an improved method of treating underground sand containing formations to stabilize the incompetent formation. An additional object is to provide a fluid permeable consolidated formation sand between the loose formation sand and the well bore to prevent or to minimize the flow of unconsolidated sand particles therethrough while maximizing the flow of desired fluids and particularly petroleum hydrocarbons therethrough. A still further object is to provide a novel treating composition for use in stabilizing incompetent sand formations and to a method of placing same.

How these and other objects of the invention are accomplished will become apparent with reference to the accompanying disclosure. In at least one embodiment of the method of this invention at least one of the foregoing objects will be obtained.

It has been discovered that an improved method of treating an incompetent sand containing underground formation comprises introducing into said formation a treating composition consisting essentially of an acrolein dimer which may be dissolved or dispersed in a suitable solvent, and polymerizing the acrolein dimer as hereinafter more fully described to consolidate the formation. The resultant consolidated sand serves to prevent or to materially reduce the flow of the unconsolidated sandy particles therethrough while permitting the flow of desirable formation fluids at a substantially unimpaired rate.

In carrying out the method of the present invention the treating composition of acrolein dimer or acrolein dimer in the solvent is pumped down the well bore under sufficient pressure to force the composition into the unconsolidated formation. When the composition is placed in the formation to be consolidated the dimer is polymerized by a gaseous catalytic agent or by a combination of the catalytic agent and heat. There is formed a fluid permeable consolidated sand that prevents or decreases the movement of the unconsolidated sand particles therethrough into the well bore. The dimer component of the composition sets up and hardens as polymerization occurs. After the dimer polymerizes and hardens the well can be equipped for production and the formation fluids can be recovered by passing through the resulting formed consolidation into the well bore and recovered therefrom without the formation fluids being contaminated with the presence therein of unconsolidated sand particles.

The method of the present invention is particularly adaptable for use in any type of well completion but is generally used in a well wherein casing has been set and which has perforations therein at the desired intervals behind which the unconsolidated formation sands are located. Packers can be initially set above and below the perforated intervals to prevent the treating composition from passing into the nonisolated portions of the well and also to permit buildup of sufficient pressures on the said composition to force same through the perforations and into the formation without plugging up the well bore. After the treating composition has been forced through the casing perforations and into the formation and after polymerization of the dimer, the well is closed in to permit the polymer to set.

The treating composition useful in the method of the present invention must meet certain specific requirements. The concentration of acrolein dimer present in the treating composition can vary from about 25 to 100 percent by volume with excellent results being obtained at dimer concentrations of between 40 and 75 percent and particularly at about 50 percent for the most effective results. Concentrations below about 25 percent are not desirable because the resulting consolidation is too weak.

The solvent component may be an oxygenated aliphatic hydrocarbon solvent or an aromatic hydrocarbon solvent or a petroleum fraction to effect solubilization of the dimer. Representative oxygenated aliphatic hydrocarbon solvents include acetone, methylethylketone, methanol, ethanol, isopropanol, and mixtures of such solvents. The preferred solvent is acetone since it seems to absorb traces of water from the sand grains when the treating solution is placed in the formation. Representative aromatic hydrocarbon type solvents include benzene, toluene, xylene and mixtures thereof.

Selected petroleum fractions have been found suitable as the solvent component such as a kerosene or diesel fraction having a cetane number of at least about 45, an IBP of about 310° and an EP of about 530°F. or a naphthalene petroleum fraction from a topped catalytic reformate bottoms cut having an API Gravity of about 20°, IBP of about 370° and an EP of about 750°F. or mixtures thereof.

One can also employ mixtures of the oxygenated aliphatic hydrocarbons, aromatic hydrocarbon type and the petroleum fraction as the solvent.

The gaseous catalytic agent for the treating composition must be one that on contact the dimer will effect rapid polymerization of the acrolein dimer. Suitable gaseous catalytic agents include nitrogen tetroxide, sulfur dioxide, sulfur trioxide, hydrogen halides such as hydrogen chloride and the like, preferably hydrogen chloride. These gaseous catalysts can be employed alone or in an inert gaseous carrier medium such as air or nitrogen, carbon dioxide, and the like. One may use gaseous hydrogen chloride catalyst in combination with heat (either externally added or by an inert carrier gas or from the heat of the formation itself or from both sources) when very rapid dimer polymerization is desired.

When one desires to attain superior compressive strength in the consolidated sand formation, it is advantageous to employ a silane bonding agent such as gamma-glycidoxypropyl-trimethoxysilane in the dimer composition. This material functions to improve surface adhesion of the dimer to the sand grains so that the resultant polymer also has improved adhesion to these grains and one achieves improved compressive strength in the consolidated sand.

This material or other silanes of similar type is used in an amount of from about 0.01 to 3.0 percent by volume of the dimer solution, preferably about 0.5 to 2.0 percent by volume.

The composition of the present invention is preferably employed in the following manner.

The formation sand to be consolidated is preferably flushed with a petroleum fraction such as kerosene or diesel oil to remove crude oil and some connate water from the formation. The formation is next flushed with a water and oil miscible solvent such as acetone, methanol, or isopropyl alcohol to remove remaining traces of oil and all connate water. This pretreating step will enhance the bonding of the polymerized dimer to the sand grains of the consolidation.

The composition containing the acrolein dimer desirably in solution in the solvent is introduced into the bore hole and placed adjacent to the unconsolidated sand particles in the formation. Following introduction of the treating solution into the formation one can displace the treating solution further into the sand consolidation area by employing an inert flushing gas such as nitrogen. The flushing gas also serves to open the formation pores by removing some of the treating solution therefrom.

The treated formation then is contacted with the gaseous catalytic material, preferably hydrogen chloride in nitrogen, to polymerize the acrolein dimer and effect consolidation of the sand particles in contact with the dimer. After a setting time to permit curing the polymer production of petroleum from the formation can be initiated or renewed.

Rates of injection of the preflush solution or solutions and the treating solution may vary from about 1 to about 3 gallons per minute per perforation. An injection rate of from about 1.5 to 2.5 gallons per minute per perforation is desirable for consistently good results. The inert flushing gas is employed in an amount of from about 5 to 30 cubic feet and preferably from about 10 to 25 cubic feet per perforation.

The flow rate of the gas mixture of the gaseous catalyst and the inert carrier gas may vary from about 0.05 to about 20 cubic feet per minute per gallon of dimer solution per perforation, preferably about 1—10 cubic feet per minute per gallon of dimer solution. The concentration of the gas catalyst in the carrier gas may vary from about 10 to about 50 percent by volume, a preferred range is from about 25 to 40 percent by volume.

In the method of the present invention, it has been found that the permeability of the consolidated sand varies with the volume of gas used as the pusher gas and that the compressive strength of the consolidation is in inverse proportion to the volume of the pusher gas.

Following is a description by way of example of the method of the present invention. In the examples the test procedure used is described below.

TEST PROCEDURE A

The method of the present invention was evaluated in a test chamber, shaped in the form of a truncated cone measuring about 22 inches in height and 18 to 20 inches in diameter, formed from a section of steel pipe. The chamber has an internal volume of about 3.1 cubic feet. One end of a high pressure hose is connected to a removable steel fitting extending about 5 inches into the test chamber. The other end was connected to the discharge end of a pump having an output of up to 10 gallons per minute at 225 p.s.i.g. The discharge end of the test chamber is fitted with a removable cover arranged to allow easy passage of fluid therethrough while retaining the sand particles therein. The intake side of the pump was connected to various supply vessels by one inch diameter steel pipe equipped with associated feeder pipes and valves.

The procedure used in the evaluation was as follows:
1. The test chamber was hand packed with the test sand and the cover put in place.
2. Sand laden water was pumped through the cell to further pack the chamber and compact the sand. Pumping was continued until a pressure buildup of 20—40 p.s.i. was indicated at the pump with a throughput of 5—10 gallons of water per minute.
3. The test chamber was heated to the selected test temperature by circulating heated water therethrough.
4. Hot diesel oil was then passed through the chamber to remove excess water and to simulate a water-wet oil saturated formation sand. An alcohol or acetone flush is then used to remove traces of water and oil from the sand.
5. The test solution was passed into the chamber at a rate of about 2 gallons per minute until all of the test solution was introduced into the chamber.
6. There was introduced into the test chamber the gaseous catalyst to effect polymerization of the dimer.
7. The treated sand was permitted to set for 0.5—72 hours. The treated sand was then removed from the chamber, split longitudinally, and cores taken therefrom for strength and water permeability measurement.

EXAMPLE 1

The test chamber was packed with a fine white sand having a permeability of about 13 darcies obtained from the Pennsylvania Glass Sand Co. and designated as Oklahoma No. 1 sand. The chamber was then heated to about 140°F. and flushed with approximately 30 gallons of a commercial diesel oil heated to 140°F. Thereafter the chamber was first flushed with approximately 4 gallons of acetone, then treated with the treating composition composed of 2 gallons of acrolein dimer and 2 gallons of acetone. 100 ml. (0.66 percent by volume) of the bonding agent gamma-glycidoxypropyltrimethoxysilane was also present. The chamber was then treated with gaseous nitrogen at 50 p.s.i.g. until very little further fluid was evolved. Next the chamber was treated with hydrogen chloride was at 25 p.s.i.g. until the emission of hydrogen chloride was detected from the lower end of the chamber. The test chamber temperature increased to about 150°F. during this treatment. After a standing time of 30 minutes, the chamber was flushed with water at 150 p.s.i.g. and a rate of 10 gallons per minute. Thereafter the consolidated sand was removed and samples were taken therefrom to determine water permeability and compressive strengths of the samples.

One sample $1d$ one inch down from the end of the injection tube and in line therewith has a permeability of 10.2 darcies and 1130 p.s.i. compressive strength. A sample $4d$ 4 inches down from the end of the injection tube has 11.1 darcies permeability and 1370 p.s.i. compressive strength. Another sample $12d$ one foot down from the end of the tube had 11.7 darcies permeability and 1200 p.s.i. compressive strength. A sample $16d$ 16 inches down had 9.62 darcies permeability and 1095 p.s.i. compressive strength.

EXAMPLE 2

In another test a 80 percent by volume acrolein dimer in benzene was used as the treating solution. Examination of the resulting consolidated sand showed that the water permeability was about 82 percent of the original sand permeability.

EXAMPLE 3

A 1 inch internal diameter by 6 inch long glass tube was packed with a Berkley fine sand having a permeability of about 3.5 darcies. The length of the packed sand was about 5 inches. Each end of the tube was fitted with a stopper containing a conduit passing therethrough to permit introduction of gases and fluid therein at one end and withdrawal of same from the other end.

In one tube the sand was packed by pressurized water and preflushed with acetone. Then 10 ml. of a solution of 25 percent by volume acrolein dimer in acetone also containing 2 percent by volume of the silane bonding agent of example 1 was injected into the sand and followed by nitrogen gas treatment. Next, 33 percent by volume of hydrogen chloride in nitrogen was passed into the treated sand to polymerize the dimer.

After setting the water permeability retention of the consolidated sand was found to be 97.4 percent of the original permeability.

Obviously, many modifications and variations of the invention as hereinbefore set forth may be made without departing from the spirit and scope thereof and therefore only such limitations should be imposed as are indicated in the appended claims.

I claim:

1. A method of treating an oil-containing incompetent formation penetrated by a well bore to prevent the movement of unconsolidated sand particles from said incompetent formation to the well bore as the oil is recovered from said formation which comprises injecting a treating composition comprising from 25 to 100 percent by volume of acrolein dimer and 75 to 0 percent by volume of solvent, into said incompetent formation, polymerizing the acrolein dimer with a gaseous catalyst, permitting the polymerized dimer to set and form a fluid permeable consolidated sand and recovering oil from said formation through said formed consolidated sand.

2. Method as claimed in claim 1 wherein the treating composition comprises from about 40 to about 75 percent by volume of acrolein dimer and from about 60 to about 25 percent by volume of an oxygenated aliphatic hydrocarbon solvent.

3. Method as claimed in claim 2 wherein the solvent is acetone.

4. Method as claimed in claim 1 wherein the treating composition comprises from about 40 to about 80 percent by volume of acrolein dimer and from about 60 to about 20 percent of an aromatic hydrocarbon solvent.

5. Method as claimed in claim 4 wherein the solvent is benzene.

6. A method as claimed in claim 1 wherein the treating composition also contains 0.05 to 3 percent by volume of the composition of a gamma-glycidoxypropyltrimethoxysilane bonding agent.

7. A method as claimed in claim 1 wherein the formation is pretreated with a water miscible solvent before injection of the treating composition.

8. A method as claimed in claim 7 wherein the pretreating solvent is selected from the group consisting of acetone, isopropyl alcohol and mixtures thereof.

9. A method as claimed in claim 1 wherein the injected treating composition is contacted with gaseous hydrogen chloride to effect polymerization of the said dimer.

10. A method as claimed in claim 9 wherein the gaseous hydrogen chloride catalyst is admixed with an inert gaseous carrier gas selected from the group consisting of air, nitrogen and carbon dioxide.

11. A method as claimed in claim 10 wherein the mixture contains from 25 to 40 percent by volume of hydrogen chloride and 75 to 60 percent by volume of nitrogen.

12. A method as claimed in claim 1 wherein prior to contact with the polymerization catalyst the injected treating composition is contacted with from about 5 to about 30 cubic feet of nitrogen gas.